(12) United States Patent
Ambrosetti et al.

(10) Patent No.: US 11,802,715 B2
(45) Date of Patent: Oct. 31, 2023

(54) METHOD FOR TRANSFERRING THE HEAT CONTAINED IN A GAS, AND HEAT EXCHANGER FOR THIS PURPOSE

(71) Applicants: Synhelion SA, Lugano (CH); ENI S.P.A., Rome (IT)

(72) Inventors: Gianluca Ambrosetti, Gintilino (CH); Philipp Good, Zürich (CH)

(73) Assignees: Synhelion SA, Lugano (CH); ENI S.P.A., Rome (IT)

( * ) Notice: Subject to any disclaimer, the term of this patent is extended or adjusted under 35 U.S.C. 154(b) by 366 days.

(21) Appl. No.: 16/628,293

(22) PCT Filed: Jun. 28, 2018

(86) PCT No.: PCT/CH2018/050020
§ 371 (c)(1),
(2) Date: Jan. 3, 2020

(87) PCT Pub. No.: WO2019/006565
PCT Pub. Date: Oct. 1, 2019

(65) Prior Publication Data
US 2020/0217561 A1     Jul. 9, 2020

(30) Foreign Application Priority Data

Jul. 7, 2017 (CH) .................................. 00886/17
Jan. 24, 2018 (CH) .................................. 00082/18

(51) Int. Cl.
*F24S 20/20* (2018.01)
*F28D 7/16* (2006.01)
(Continued)

(52) U.S. Cl.
CPC ............... *F24S 20/20* (2018.05); *F28D 7/16* (2013.01); *F01N 2240/02* (2013.01); *F24S 80/20* (2018.05); *F28F 9/22* (2013.01); *F28F 13/18* (2013.01)

(58) Field of Classification Search
CPC ... F24S 20/20; F24S 80/20; F28D 7/16; F28F 9/22; F28F 13/18; F01N 2240/02
See application file for complete search history.

(56) References Cited

U.S. PATENT DOCUMENTS 3,604,400 A * 9/1971 Sharan ...................... F23C 6/02
431/158
3,954,097 A * 5/1976 Wilson, Jr. .............. F24S 23/74
126/648
(Continued)

FOREIGN PATENT DOCUMENTS

CN       205337423       6/2016
DE       3743798 A1      7/1989
(Continued)

OTHER PUBLICATIONS

WIPO, International Preliminary Report on Patentability dated Jan. 7, 2020, in PCT/CH2018/050020, 6 pgs.
(Continued)

*Primary Examiner* — Jon T. Schermerhorn, Jr.
(74) *Attorney, Agent, or Firm* — Henry Patent Law Firm PLLC (57) ABSTRACT

The invention relates to a method for exchanging heat contained at a fluid. A gas which is heated indirectly and emits infrared radiation is used as the fluid, said fluid being guided to the heat exchanger via an inlet and through art absorber chamber in the heat exchanger, and at least one surface, which absorbs the infrared radiation of the gas in order to use the heat of the gas, is provided in the absorber chamber. The mass flow and the temperature of she gas are
(Continued)

additionally adjusted and the at least one surface which is absorbent for the heat exchange is designed such that the ratio $\Psi$ of the heat flowing through the surface as a result of absorption to the total heat flowing through the surface is ≥0.6 during operation. Thus, a simpler and less expensive heat exchanger can be implemented.

9 Claims, 8 Drawing Sheets

(51) Int. Cl.
*F24S 80/20* (2018.01)
*F28F 9/22* (2006.01)
*F28F 13/18* (2006.01)

(56) References Cited

U.S. PATENT DOCUMENTS

| | | | | |
|---|---|---|---|---|
| 5,216,981 | A * | 6/1993 | Solomon | F23C 1/00 |
| | | | | 122/367.3 |
| 6,325,000 | B1 * | 12/2001 | Furuta | F23G 5/12 |
| | | | | 110/259 |
| 2002/0153004 | A1 * | 10/2002 | Agata | F22B 1/006 |
| | | | | 126/637 |
| 2006/0110141 | A1 * | 5/2006 | Burkett | F24H 3/0405 |
| | | | | 392/360 |
| 2015/0168012 | A1 * | 6/2015 | Amberson | F24H 9/1863 |
| | | | | 392/377 |
| 2021/0278572 | A1 * | 9/2021 | Shvets | H01L 31/0521 |

FOREIGN PATENT DOCUMENTS

| | | |
|---|---|---|
| EP | 1052461 A2 | 11/2000 |
| FR | 2381967 A1 | 9/1978 |
| NL | 7703915 A | 10/1977 |
| WO | WO2004027098 | 4/2004 |
| WO | WO-2016171164 A1 | 10/2016 |

OTHER PUBLICATIONS

Merkt, Andreas, International Search Report for PCT/CH2018/050020, dated Oct. 16, 2018 [2 pages].

* cited by examiner

METHOD FOR TRANSFERRING THE HEAT CONTAINED IN A GAS, AND HEAT EXCHANGER FOR THIS PURPOSE

The present invention relates to a method, a heat exchanger and a method for operating a furnace.

Solar power plants, such as tower solar power plants for example, operate on an industrial scale, such as the Ivanpah solar power plant in California, which has a nominal output of 392 MW, which directly generates steam at a temperature range of more than 750° K at 170 bar by concentrated solar radiation being directed to pipes of a heat exchanger arranged in the tower, in which the steam is generated in this manner. Heat stores consisting of salt allow steam to be used beyond the phases of good solar radiation.

For a higher efficiency, tower solar power plants are increasingly being provided, which heat air to over 1000° K up to about 1500° K via a volumetric receiver, and, today, on a trial basis, up to around 2000° K and beyond. The heated air is then used for generating steam or process heat via heat exchangers. It is also foreseeable that, for example, such tower solar power plants will also be designed for a power range in the style of the Ivanpah solar power plant.

On the other hand, it is known that, with small local stand-alone arrangements with a dish receiver (which can also be grouped into clusters), temperatures above 1000° K, even beyond 2500° K can be achieved at a power in the range of kilowatt hours. The use of such heat sources is also interesting.

According to the nature of the matter at hand, the radiant heat accumulated in the receiver of solar systems is removed from the receiver at temperatures of more than 1000° K in the form of heated air. In turn, the use of the heat transported in this way requires the use of downstream heat exchangers. The good heat transfer into the medium to be heated, which is essential for a heat exchanger, requires considerable construction effort, mostly associated with a considerable flow resistance in the heating medium.

Accordingly, the object of the present invention is to create an improved method for transferring the heat contained in a gas and an improved heat exchanger.

This task is achieved by means of a method, by means of a heat exchanger and an operating method.

By means of using a gas emitting infrared radiation, which is guided into an absorber chamber of a heat exchanger, its heat can be transferred with enough power in a radiative manner, i.e. via its infrared radiation, onto an absorbing surface of the heat exchanger. This eliminates method steps and arrangements for optimized heat transfer by means of convection, which, based on the greatest possible ratio of convective surfaces to the volume of the heat emitting gas, are tedious and expensive to produce and generate a considerable flow resistance.

Due to the fact that a gas emitting heat by my means of infrared radiation is guided into an absorber chamber of a heat exchanger, the desired heat transfer can predominantly take place in an absorptive manner, which allows for the heat exchanger to be designed in a simple manner accordingly. By providing a furnace with an inlet for indirectly heated gas radiating in the infrared range, this can be operated with the indirectly heated gas instead of combustion products emitting heat via radiation (gases and, in particular, soot, which also radiates at a visible frequency range, thereby making the flame visible), which allows for a furnace retrofitted with a low level of effort to be operated in a pollutant-free manner and for the operation of pollutant-eliminating plants to be dispensed with and for existing infrastructure with small modifications to continue to be used.

If, with regard to the absorbent surface, the ratio $\Psi$ of the heat flow as a result of absorption to the total heat flowing through it is $\geq 0.6$, the advantages shown above are particularly clear.

Infrared-radiating gases can, in particular, be heated by a receiver according to the as yet unpublished patent application CH 00627/17, which heats a gas absorptively in contrast to the known volumetric receivers. Such gases, which can be heated by means of radiation by way of black-body radiation, in turn, radiate for their part in the infrared range and are then ideally available to be used according to the invention in addition to conventionally heated infrared-radiating gases.

Preferred embodiments have the features of the dependent claims.

The invention is explained in more detail below based on the figures.

Figure 1A:
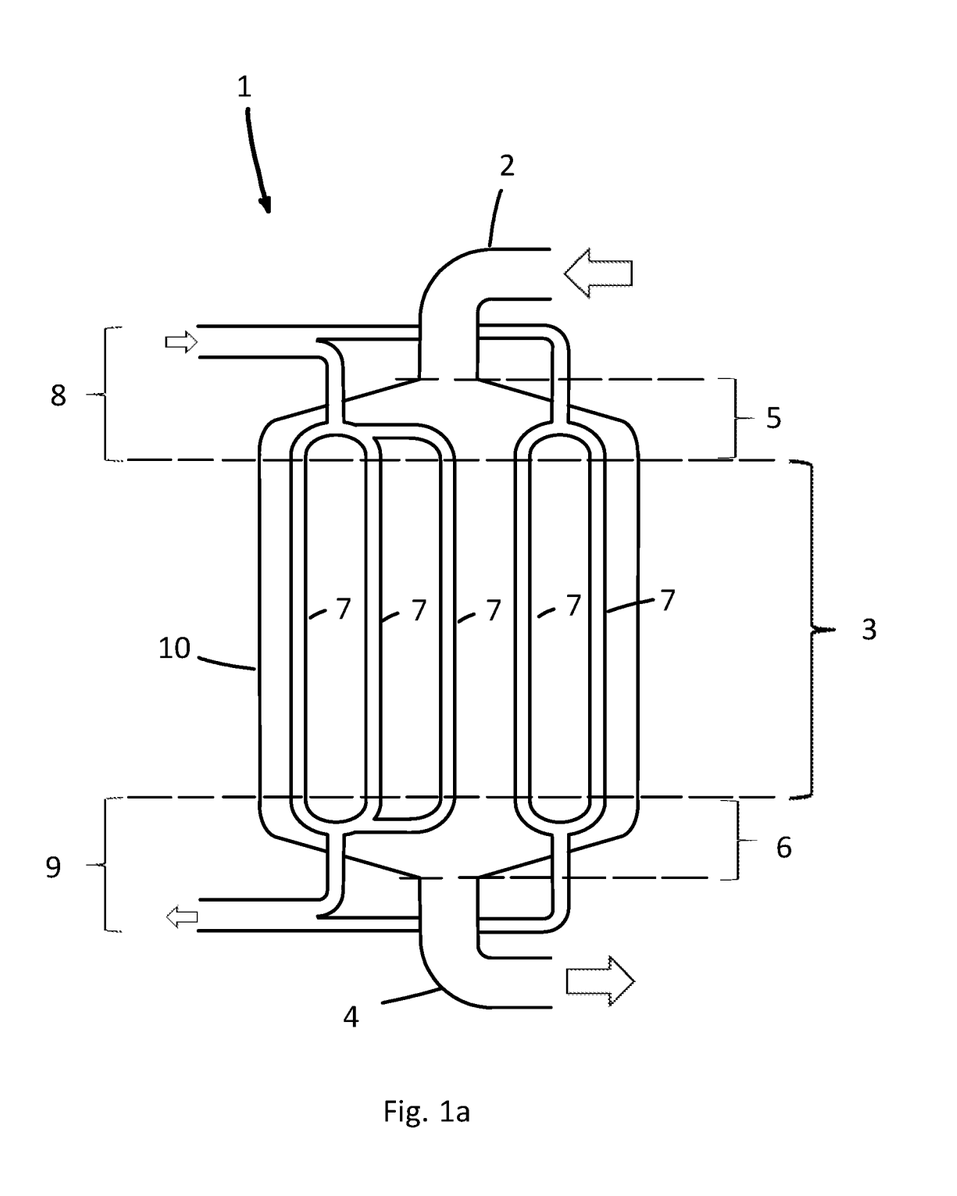
FIG. 1a schematically, a heat exchanger according to the invention in a cross-section, FIG. 1b a schematic view from the outside of the absorber chamber of a heat exchanger in the style of the one in FIG. 1a, FIG. 1c schematically, a modified embodiment of the heat exchanger in FIGS. 1a and b in the view of FIG. 1b, FIG. 2a the scheme of a system with a heat store and a heat exchanger according to the invention, FIG. 2b the steps of the method according to the invention for transferring the heat contained in a gas, FIG. 3a schematically, a view of the absorber chamber of a conventional reformer operated according to the invention, FIG. 3b the steps of the operating method according to the invention, and FIG. 4 a receiver for generating indirectly heated infrared-radiating gas.

FIG. 1a schematically shows a cross-section through an embodiment of a heat exchanger 1 according to the present invention. A heat-emitting indirectly heated (for this, see the following) gas enters via an inlet 2 according to the drawn-in arrow direction into an absorber chamber 3, flows through this to a discharge 4, through which the gas leaves the heat exchanger 1 again, wherein, in the shown embodiment, the inlet 2, the absorber chamber 3 and the discharge 4 form an arrangement for the transport of gas through the heat exchanger 1.

An indirectly heated gas according to the present invention has been heated before the heat exchanger 1, wherein its heat to be exchanged in the absorber chamber does not originate from its own combustion as opposed to a flue gas generated in the absorber chamber, i.e. a combustion product, whose heat to be exchanged was caused by a combustion process acting in the absorber chamber.

Between the inlet 2 and the absorber chamber 3, there is a distributor 5 for the gas flowing through the absorber chamber 3 in such a way that this flows through this across the whole diameter of the absorber chamber 3. A collector 6 for the gas guides this into the discharge 4 after the absorber chamber 3. Here, the distributor 5 and the collector 6 are also components of the arrangement for the transport of gas by the heat exchanger 1. Distributors 5 and collectors 6 can be suitably designed on an individual basis by a person skilled in the art.

In the embodiment shown, the absorber chamber 3 is cylindrical; the conducted gas is a gas radiating in the infrared range or a gas mixture that comprises gases radiating in the infrared range.

In the absorber chamber 3, lines are arranged that run axially to this and are designed as pipes 7 here, which are fed for their part by a distributor 8 for fluids to be heated and flow into a collector 9 for heated fluids. In turn, the distributor 8 and the collector 9 can be suitably designed on an individual basis by those skilled in the art. The surfaces of pipes 7 form infrared-radiation-absorbent surfaces. If only one pipe 7 is provided, at least one absorbent surface is present, otherwise a plurality of them, in particular in the present case shown with a bundle of pipes 7 (see FIGS. 1b and 1c).

The hot gas radiating in the infrared range flowing through the heat exchanger 1 and thus the absorber chamber 3 radiates accordingly onto the surfaces of the pipes 7, heats these so that a heat exchange takes place between the infrared-radiating gas and the absorbent surfaces of the pipes 7, which, for their part, heat the fluid flowing through them. Thereby, the pipes form a surface provided for the heat exchange via infrared radiation in contrast to the surface of the wall 10 of the absorber chamber 3 for example, which, despite insulation, causes an undesired heat loss of the gas that does not serve the intended heat exchange and are designed to absorb the infrared radiation, i.e. they have a surface that is not designed as a reflector.

Gases radiating in the infrared range include, for example, $CO_2$, water vapour, $CH_4$, $NH_3$, CO, $SO_2$, HCl, NO and $NO_2$.

In general, gases emit electromagnetic radiation in the frequency bands characteristic of them, wherein the radiation intensity or the power of the radiation per surface in $W/m^2$ depends on the temperature.

For solid bodies, the model of the (ideal) radiant black body ("black-body radiation") applies, whose radiation intensity in $W/m^2$ across the entire frequency spectrum depends on its temperature, wherein the maximum intensity shifts towards higher frequencies as temperature increases and simultaneously increases at the fourth power of the temperature.

Even the real solid body exhibits decreases in radiation in its frequency spectrum with relation to the frequency spectrum of the (ideal) black body; for a certain real solid body, the radiation intensity decreases in some cases significantly in frequencies that are characteristic for this.

In this respect, gases have more extreme properties, which only radiate in individual frequency bands, which can be in the ultraviolet range, in the visible range or in the infrared range. If a gas radiates at a comparatively low temperature, for example, in the ultraviolet range, its radiation intensity, i.e. the radiated power, is small; if it radiates at the same temperature in the infrared range, its radiation intensity is high. According to the invention, this characteristic of the gases is utilized by using gases radiating in the infrared range in today's technically controllable temperature ranges of up to 2500° K or above (in the coming years, these temperature ranges will shift upwards), wherein their radiation intensity becomes significant and thus efficiently usable for heat exchange. In addition to the advantages indicated below, this allows a very simple yet efficient heat exchanger to be designed, which transfers the heat from a gas radiating in the infrared range to another medium. Among other things (see below concerning this), the usual construction effort for convective heat transfer, which takes place by means of contact and accordingly requires a large heat-exchange area in relation to the volume of the heat-emitting gas, is dispensed with.

The applicant has found that the constructive advantages of the heat exchange by means of emission/absorption have a particularly high impact if the ratio $\Psi$ of the heat flow exchanged by means of absorption to the total heat flow exchanged (by means of absorption and convection) is $\geq 0.6$, i.e. the proportion of absorption outweighs the proportion of convection. Thereby, a heat exchange as a result of convection is not avoidable even in the case of the simplest implementation of the heat exchanger and, in the sense of the heat exchange, is also quite welcome. However, the lower the proportion of convection is, the geater the constructional simplification is and the littler the effort for the production and, in any case, the maintenance of the heat exchanger itself are. On an individual basis, the person skilled in the art can suitably define the determining parameters (the infrared-radiating gas or the gas mixture, its temperature, pressure and flow rate, the geometry of the absorber chamber and the at least one absorbent surface, etc.) to adjust the ratio $\Psi \geq 0.6$ and to implement the advantages according to the invention.

At this point, it should be noted that the embodiment shown with five pipes 7 with the diameter of the cylindrical absorber chamber 3 is to be understood purely as an example for explaining the conditions at hand. For example, it is possible to provide any number of lines passing through the absorber chamber in any configuration and any progression (i.e. not only running axially), provided that this still means the proportion of absorptive heat intake is predominate, i.e. the ratio of $\Psi \geq 0.6$ is implemented.

According to the invention, a method results for exchanging heat contained in a fluid, wherein a gas which is heated indirectly and emits infrared radiation is used as the fluid, said fluid being guided to the heat exchanger (1) via an inlet (2) and through an absorber chamber (3) in the heat exchanger (1), wherein at least one surface, which absorbs the infrared radiation of the gas in order to use the heat of the gas, is provided in the absorber chamber (3), and wherein the mass flow and the temperature of the gas are adjusted in such a way and the at least one surface which is absorbent for the heat exchange is designed in such a way that the ratio $\Psi$ of the heat flowing through the surface as a result of absorption to the total heat flowing through the surface is $\geq 0.6$ during operation.

A heat exchanger for carrying out this method has an arrangement for the transport of heat-emitting gas in the heat exchanger by means of infrared radiation, which has an absorber chamber with at least one surface provided for the heat exchange via infrared radiation, wherein the heat exchanger is designed with an inlet for indirectly heated gas emitting heat and the absorber chamber and the at least one absorbent surface are designed in such a way that the ratio $\Psi$ of the heat flowing through it to the overall heat flowing through it is $\geq 0.6$ during operation in the case of a predetermined mass flow and a predetermined temperature of the gas emitting heat in the absorbent surface. Thereby, the heat exchanger is preferably designed with an arrangement for the transport of gas emitting heat in the heat exchanger by means of infrared radiation, which has an absorber chamber (3) with at least one surface provided for heat exchange via infrared radiation, and an indirectly heated gas emitting heat by means of infrared radiation flowing through the arrangement, wherein the heat exchanger is designed with an inlet for indirectly heated gas emitting heat and the absorber chamber and the at least one absorbent surface are designed in such a way and the mass flow and the temperature of the gas emitting heat are adjusted in such a way that the ratio $\Psi$ of the heat flowing through it to the overall heat flowing through it is $\geq 0.6$ in the absorbing surface.

For this purpose, for example, the heat exchanger can be provided with a corresponding control system, which controls the mass flow through the absorber chamber, wherein, preferably, a temperature sensor for the temperature of the heat-emitting gas flowing to the heat exchanger is provided, which generates a corresponding temperature signal for the control system, which then adjusts and regulates the mass flow. The control system is not necessarily integrated in the heat exchanger, but can be located in a suitable location in the system in which the heat exchanger is used. The person skilled in the art can design the control system to be suitable on an individual basis, including the sensors for the data to be processed by the control system so that the ratio is $\Psi \geq 0.6$.

Figure 1B:
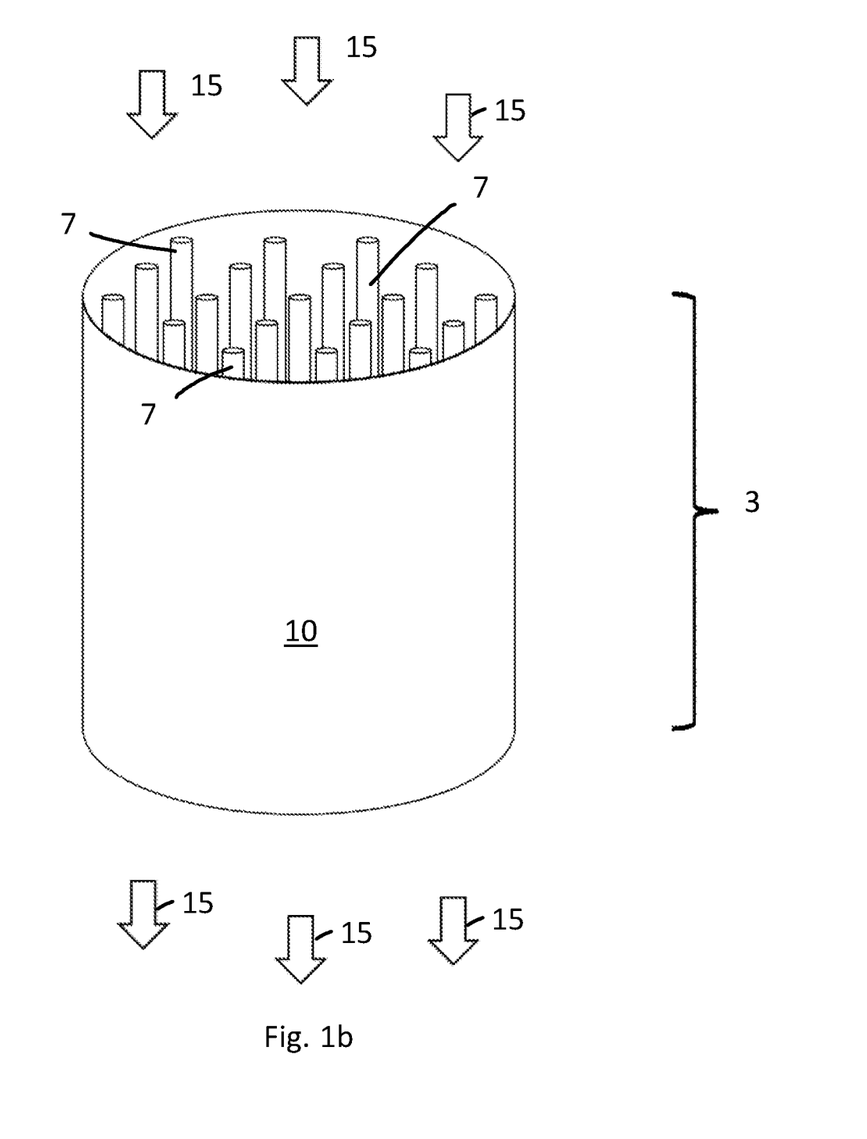

FIG. 1b shows a view from the outside on the absorber chamber 3 of the heat exchanger 1 in FIG. 1a. Clearly, the cylindrical wall 10 of the absorber chamber 3, as well as the pipes 7, which are arranged in a spatial bundle running next to each other and thus filling up the cylindrical absorber chamber 3 in the shown embodiment in an approximately even manner.

For process engineering reasons, another arrangement can also be provided. The pipes 7 are essentially absorptively heated during operation of the heat exchanger 1 (FIG. 1a) by the axially flowing (symbolized by the arrows 15) infrared-radiating gas (for example, water vapour) across their length. For example, components for the (catalytic) production of syngas or other chemically reacting substances or simply a fluid, which can guide the exchanged heat to a suitable location, in terms of a secondary circuit for example, as this can be the case with process heat, flow here in the pipes themselves in the same direction as indicated by the arrows 15.

In the case of the production of syngas, the arrangement shown in FIGS. 1a and 1b represents a reformer with a heat exchange implemented according to the invention. High temperatures are required for syngas production, such as an average pipe temperature of 1200° K for example. In the present case, in the sense of a simple exemplary embodiment, an outer pipe diameter of 130 mm, an inner pipe diameter of 100 mm, and a pipe length of 12 m here (i.e. a height of the absorber chamber 3 of 12 m) is assumed, wherein the heat flow q' in a pipe 7 into a pipe should be 100 kW/m² of the pipe surface (which of course depends on the respective process taking place in the pipe). Furthermore, it is assumed that the distance of the pipes from centre to the centre is six-fold the outer diameter of the pipes, i.e. 780 mm, and the distance of an outermost pipe to the wall 10 of the absorber chamber 3 is half of that, i.e. 390 mm.

Thus, the absorber chamber 3 has a diameter of 3.9 m. The partial pressure of the infrared-radiating gas is 1 bar, wherein the water vapour flowing through the assumed example has the ambient pressure of 1 bar (so no non-radiating gases are added).

Under the above assumptions, the applicant's rough calculation gives the values for the ratio $\Psi$ shown in the table below, based on two examples, at a varying temperature of the available indirectly heated gas:

| | | |
|---|---|---|
| $T_{in}$ (inlet temperature of the gas) | 1700° K | 1580° K |
| $T_{out}$ (outlet temperature of the gas) | 1340° K | 1460° K |
| v (Flow rate) | 7.1 m/s | 21.1 m/s |

-continued

| | | |
|---|---|---|
| $\Psi$ (ratio, absorption/absorption + convection) | 0.97 | 0.94 |
| $T_{Gas}$ average temperature of the gas for the rough calculation | 1520° K | 1520° K |

Thus, according to the invention, the heat exchange can be implemented by means of the heat exchanger 1 shown (FIG. 1a). It should be noted that, under the rough calculation, uniform conditions in absorber chamber 3 have been assumed, i.e. the effects on the wall 10 as well as the real temperature profile from the inlet to the outlet of the pipes (i.e. along the axis of the cylindrical absorber chamber 3) have been neglected. However, this does not change the basic feasibility.

Depending on the reaction (as mentioned above: for example, a syngas reaction) or the needs of the heat absorbing fluid, there is a predominant overpressure of about 40 bar in the lines (pipes 7), wherein also a higher overpressure of, for example, 100 bar can be desirable. Then, the wall thicknesses of the correspondingly lines (pipes 7) designed to be pressure-resistant increase accordingly, which, in turn, is detrimental to the heat flow into the line so that, for example, the temperature of the infrared-radiating gas must be increased in order to maintain the desired heat flow (in this example 100 kW/m²).

According to the concept of the absorber chamber 3 according to the invention (or of the heat exchanger 1, FIG. 1a), the lines 7 guided through the absorber chamber 3 can be compactly bundled, for example, so that the absorber chamber 3 is limited by a tubular wall 10. This, in turn, allows for the absorber chamber 3 to be comparatively easily designed for at higher or high pressure since tangential tensions occur in a tubular wall region due to pressure that are essentially easier to control on a constructional level. If there is a predominant overpressure in the absorber chamber 3, the pressure difference with relation to the internal pressure of the lines (pipes 7) is reduced. Accordingly, the wall thicknesses of the lines can be reduced, thereby improving the heat flow into the lines.

A heat exchanger according to the invention results with an arrangement for the transport of heat-emitting gas in the heat exchanger by means of infrared radiation, which has an absorber chamber with at least one surface provided for the heat exchange via infrared radiation, characterized in that the heat exchanger is designed with an inlet for indirectly heated gas emitting heat and the absorber chamber and the at least one absorbent surface are designed in such a way that the ratio $\Psi$ of the heat flowing through it to the overall heat flowing through it is $\geq 0.6$ during operation in the case of a predetermined mass flow and a predetermined temperature of the gas emitting heat in the absorbent surface. This furthermore results in that, preferably, the at least one absorbent surface is formed by a number of lines, preferably pipelines, and wherein the lines are arranged as a bundle, which extends through the absorber chamber, and space for the infrared-radiating heat-emitting gas operatively flowing through is provided between the pipes.

This furthermore results in the absorber chamber preferably being designed to be pressure resistant to a pressure of the heat-emitting gas of $\geq 5$ bar, preferably $\geq 10$ bar, being particularly preferred, $\geq 20$ bar and, being really preferred $\geq 50$ bar.

A rough calculation subject to the above assumptions for the dimensions of the pipes 7 and of the heat flow of 100 kW/m2 results in the following at an operating pressure of 10 bar in the absorber chamber 3 if water vapour is used as an infrared-radiating gas:

| | |
|---|---|
| $T_{in}$ (inlet temperature of the gas) | 1620° K |
| $T_{out}$ (outlet temperature of the gas) | 1340° K |
| v (Flow rate) | 3.8 m/s |
| Ψ (ratio, absorption/absorption + convection) | 0.9 |
| $T_{Gas}$ average temperature of the gas for the rough calculation | 1480° K |

The emissivity ε of a gas increases with its pressure p and the thickness L of the radiant gas layer (path length); ε=f (p, L). applies. The dimensionless curve of emissivity shows the shape of an inverted hockey stick, with a steep gradient at low path length (L) and a slight gradient at a certain distance away from the wall absorbing the radiation, i.e. a greater path length. With increasing pressure, the distances from pipe 7 to pipe 7 can be reduced, in the present example, at 390 mm, which, at an operating pressure in the absorber chamber 3 of 10 bar, leads to a diameter of 1.95 m, thus half of the diameter of the absorber chamber 3 with relation to the case with an operating pressure of 1 bar. These smaller dimensions support the pressure-resistant design of the absorber chamber, which, in turn, facilitates even higher pressures in this. On an individual basis, the person skilled in the art can, for example, determine an operating pressure in the absorber chamber 3 based on the optimum internal pressure in the lines 7 and their wall thickness (heat transport), thereby taking into consideration the effort for the pressure safety and the heat transport into the lines 7.

It should be noted at this point that, in the examples quantitatively described above, the ratio Ψ is in the range of 0.9 and above, among other things, also because of the high temperatures of the indirectly heated gas of over 1500° K. However, according to the applicant's findings, the ratio of Ψ≥0.6 according to the invention is also achievable with temperatures of the indirectly heated gas of 1000° K, for example 1300° K or, according to the examples above of more than 1500° K. This results in that, according to the invention, preferably, the indirectly heated gas has a temperature of 1000° K, preferably 1300° K, and, being particularly preferred, 1500° K.

Figure 1C:
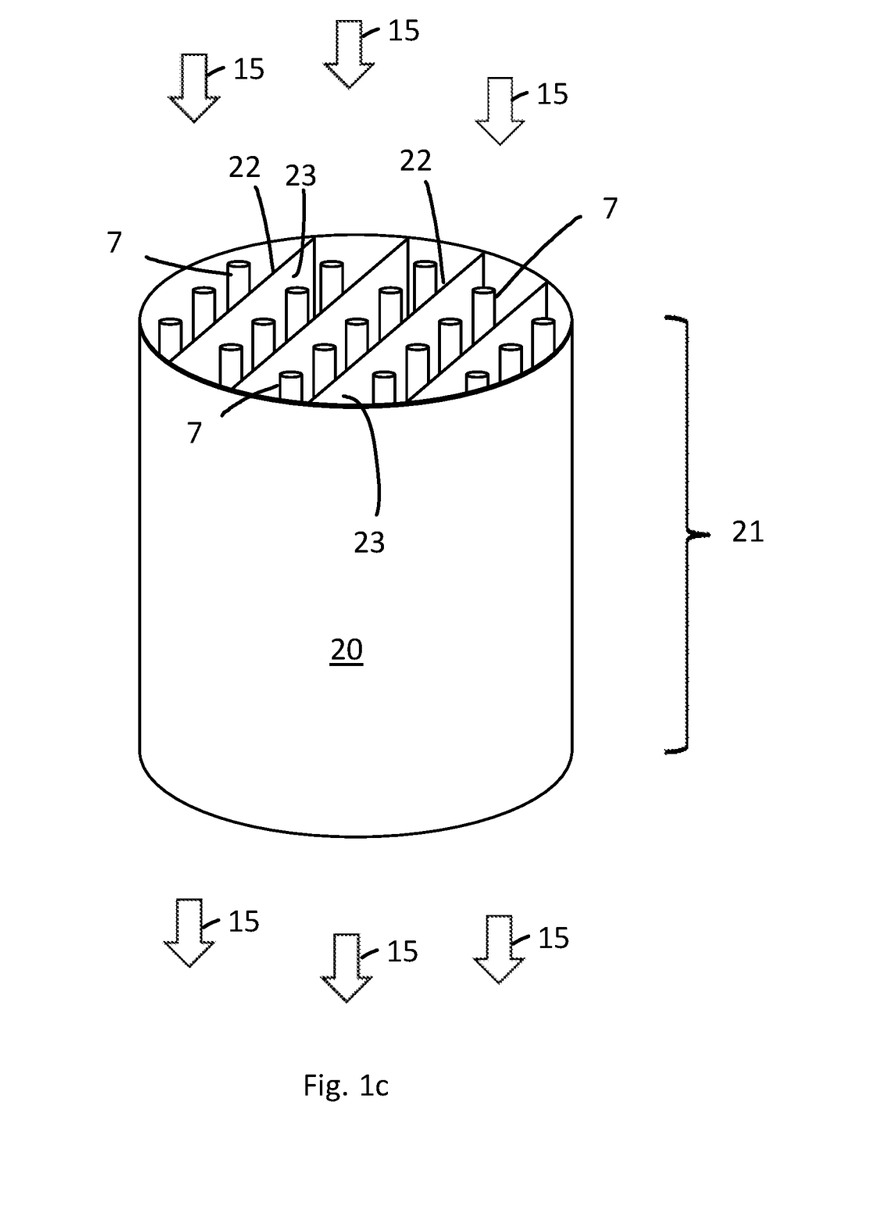

FIG. 1c shows a view from the outside of the absorber chamber 3 of another embodiment of the heat exchanger 1 in FIG. 1a. As with FIG. 1b, the cylindrical wall 20 of the absorber chamber 21, as well as the pipes 7, which are arranged in a spatial bundle next to one another, thereby filling up the cylindrical absorber chamber 21, are evident.

With relation to the embodiment in FIG. 1b, walls 22 are additionally provided, which are arranged between the pipes 7. These walls 22, or their surfaces 23, are heated during operation by the infrared-radiating gas by means of its infrared radiation until a temperature equilibrium is set since the walls 22, for their part, lose energy due to (real) black-body radiation. This black-body radiation now favourably heats the lines or, here, pipes 7. It should be noted that the wall 20 of the absorber chamber already works in this sense, the walls 22 are however additional, separate walls with additional surfaces 23 that are separate from the wall of the absorber chamber 20.

It should be mentioned above that the emissivity E curve has a first range with a strong increase and a second range with a weak increase, wherein the transition is naturally not sharp. This means that the energy irradiated into a wall first grows strongly with increasing thickness (path length L) of the radiant gas layer, then becomes increasingly weaker (but still grows nevertheless) according to a thickness dependent on the gas, among other things. This can be interpreted as insulating the gas itself, in other words, a gas area located further away from the wall is less able to emit energy onto the wall via its radiation. Now, if another wall is now arranged in a suitable area, which also heats up and then emits (real) black-body radiation, this will reach the wall to be heated virtually unhindered at least in the frequency ranges, in which the infrared-radiating gas does not absorb (for these frequencies, the insulating effect is dispensed with), thereby heating this in an unweakened manner. As a result, the heat flow q̇ through the absorbent surfaces of the lines increases. On an individual basis, the person skilled in the art can arrange such another wall at a distance, here, away from the absorbent surfaces (here: the row of pipes 7), which is in the range of the weak increase in the emissivity ε of the infrared-radiating gas, and, furthermore, so that the intensity of the black-body radiation of the other wall on the absorbent surfaces is greater than the intensity of the infrared-radiating gas layer cut off by the other wall would be (additional intensity due to the cut off path length L).

It should be noted at this point that the lines or pipes 7, in turn, also emit black-body radiation, however at a comparatively low temperature since they are heat sinks due to the fluid flowing in them. The above-mentioned other walls reach an equilibrium temperature above the temperature of the lines 7 or the at least one absorbent surface in the absorber chamber so that, in the case of this mentioned suitable arrangement, the heat irradiation onto the at least one absorbent surface can be improved.

In summary, a number of lines distributed in the absorber chamber are arranged in this, each with an absorbent surface and at least one other surface, which can, for its part, be heated during operation by the means of gas emitting heat, is provided, which irradiates the absorbent surfaces by means of black-body radiation during operation in such a way that the heat flow q̇ through the absorbent surfaces is increased by means of absorption.

Figure 2A:
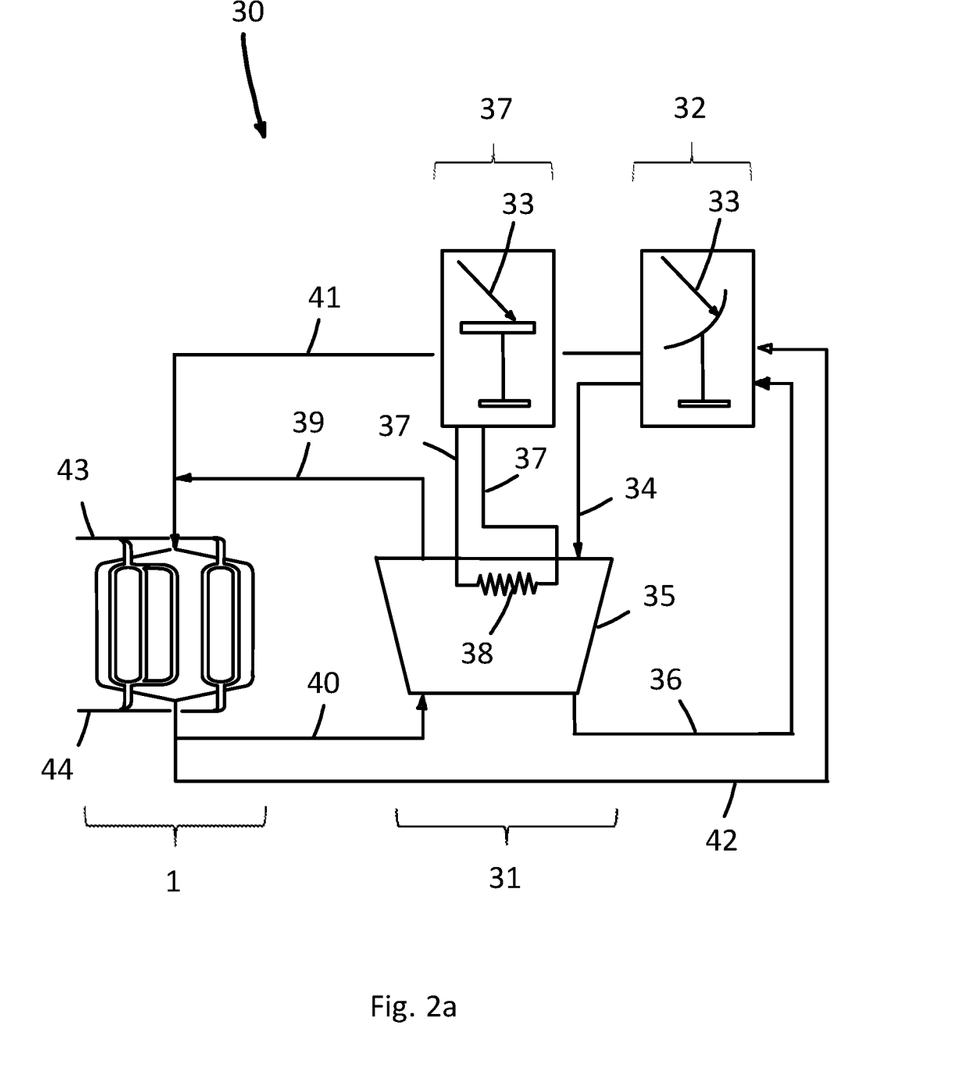

FIG. 2a schematically shows the arrangement of a system 30 for the use of solar energy with a heat exchanger 1 according to the invention, a heat store 31, as well as a receiver 32 for (concentrated) solar radiation and a photovoltaic receiver 37.

In the receiver 32, by means of incidental solar radiation 33, a suitable fluid is heated, for example, to a temperature above 1000° K, or up to over 2000° K, enters via a line 34 into a heat store 35 and via a line 36 back into the receiver 32 so that the heat store 35 can be charged with heat over the corresponding circuit via the lines 34, 36. A photovoltaic system or a photovoltaic receiver 37 generates 33 electricity by the incidence of solar radiation, which, if necessary, provides heat at the desired temperature in the heat store 31 via power lines 37 and an electric heater 38, in particular, being capable of maintaining a uniform upper temperature in the heat store at ranges of 2000° K for example. Due to the heat of the heat store 31, an infrared-radiating gas is heated and guided through the heat exchanger 1 via the lines 39, 40 in the circuit.

Preferably, however, an infrared-radiating gas is already heated by the receiver 32, which is sent via lines 41, 42 in the circuit through the heat exchanger 1, i.e. optionally supplied directly to it, depending on whether the heat store 38 should still be charged or not.

In the heat exchanger 1, a fluid is heated, which flows through this via the lines 43, 44. As mentioned above, this can generally be process heat of any kind, reactants/products for a chemical reaction or steam to drive a steam turbine (electricity). One advantage of the shown system 30 is, for example, a simple temperature control of the infrared-radiating gas supplied to the heat exchanger 1: for cooling, such non-heated gas can be added to the circuit (directly via receiver 32 or via the heat store 35); the electric heater 38 is available for heating, which, as such, can principally produce very high temperatures even if the radiation intensity of the sun is below the threshold that the receiver 32 would require for the desired very high temperature. A further advantage of the shown system is that the infrared-radiating gases can be guided in the circuit shown under pressure with comparatively simple constructional effort, wherein the heat transfer in the heat exchanger 1 can also be implemented with a low level of effort.

The shown system can therefore be operated with only one heat source respectively for the indirectly heated gas (solar receiver 32 or heat store 38) or in a grouping of these heat sources, if desired, additionally with the heater 38.

This results in that, in the case of the embodiment shown, the arrangement for the transport of the gas emitting heat is operatively (e.g. in a circuit) connected to a heat source indirectly heating the gas, which preferably has a heat store. Furthermore, the heat source has at least one of the heat producing means—a solar receiver, heat store or a preferably an electrical heater, preferably one that is powered by means of photovoltaic electricity. For the method according to the invention, this results in that, preferably, the gas emitting infrared radiation is guided in a circuit enclosing the heat exchanger, in which the gas is indirectly heated, and wherein, being furthermore preferred, a heat store is provided before the heat exchanger in this circuit. In addition, this results in that at least one of the heat sources—receiver, heat store or heater, preferably an electrical heater that is particularly preferably photovoltaically powered—is used for indirect heating.

The receiver 32 can be designed as a receiver of a tower solar power plant. For this, see the description relating to FIG. 4 below. The heat store 35 can be designed according to WO 2012/027854, wherein the bulk material can consist of $Al_2O_3$ (the salt heat stores usual nowadays are not suitable for temperatures according to the present invention since the salt then disintegrates). Photovoltaic solar plants are known to the person skilled in the art.

Figure 2B:
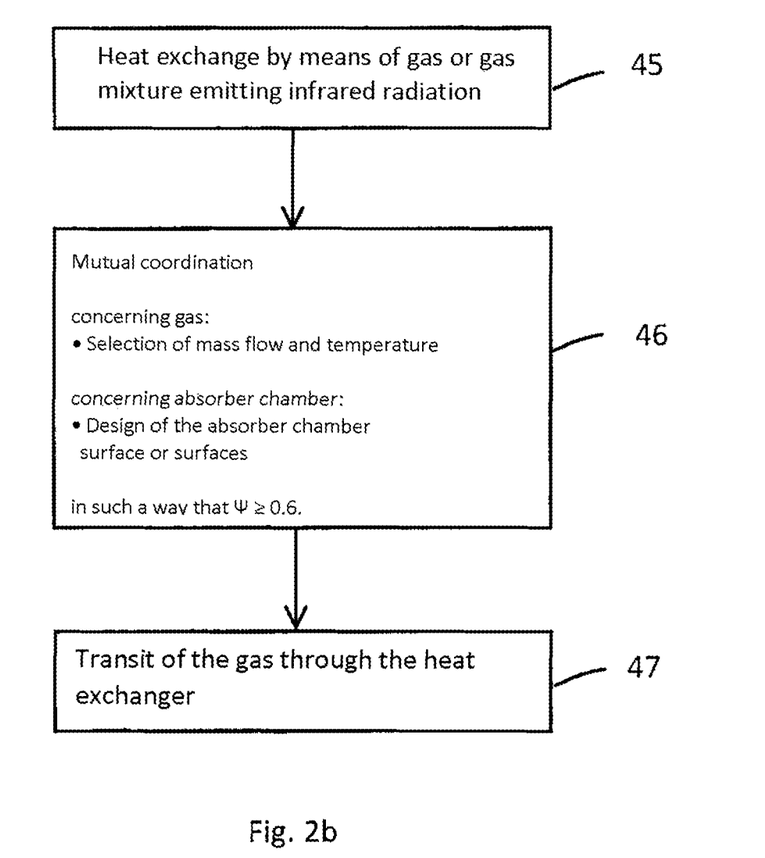

FIG. 2b shows the steps of the method according to the invention for heat exchange. At step 45, a gas is selected as a heat-emitting gas, the heat of which to be exchanged has not resulted from its combustion and which has been heated before the heat exchanger, i.e. an indirectly heated gas, and which emits infrared radiation in order to exchange heat via this radiation. Preferably, such gases are heteropolar gases. $CO_2$, water vapour, $CH_4$, $NH_3$, CO, $SO_2$, HCl, NO, and $NO_2$ or a mixture of these gases are suitable. Non-radiating gases may be mixed on an individual basis if this is appropriate for procedural reasons, however in the limits indicated by the ratio $\Psi$.

At step 46, the gas (or gas mixture) is selected for the specific case, the mass flow (flow rate and pressure) and its temperature are mutually coordinated with the respective design of the absorbent surfaces in the absorber chamber in such a way that the ratio $\Psi$ of the heat flow by means of absorption to the overall exchanged heat flow is ≥0.6, meaning the absorption prevails over the convection. Preferably, the absorbent surfaces are formed by the surfaces of lines 7, which lead through the absorber chamber 3 (FIGS. 1a to 1c), wherein, being particularly preferred, a (spatial) bundle of lines is provided since the gas can flow around this well. The fluid to be heated is guided into the lines. The absorbing surface can also be formed by a wall section of the absorber chamber, or by one or a plurality of lines (preferably pipelines) for a fluid to be heated by the heat exchange. The higher the ratio $\Psi$ that is chosen, e.g. ≥0.7, preferably ≥0.8 and being particularly preferred, ≥0.9, the easier it is to design the heat exchanger. If the gas subject to overpressure is guided through the absorber chamber (preferably ≥5 bar, preferably ≥10 bar, being particularly preferred, ≥20 bar, and being quite preferred ≥50 bar), the heat exchanger according to the invention can be designed to be particularly compact.

At step 47, the prepared heat exchange is carried out by the selected gas or gas mixture being guided through the absorber chamber with the suitably designed absorbent surfaces under the predetermined operating parameters.

This results in that, preferably, the gas emitting the infrared radiation is guided in a circuit enclosing the heat exchanger, in which the gas is indirectly heated, and wherein, preferably, a heat store is provided in this circuit before the heat exchanger. In the case of solar heating of the gas, this can also be made available outside of the periods with intense solar radiation. In addition, it emerges that at least one of the heat sources—receiver, heat store or heater, preferably an electrical heater that is particularly preferably photovoltaically powered—is used for indirect heating, whereby a favourable independence of the intensity of the respectively predominant solar radiation results.

Figure 3A:
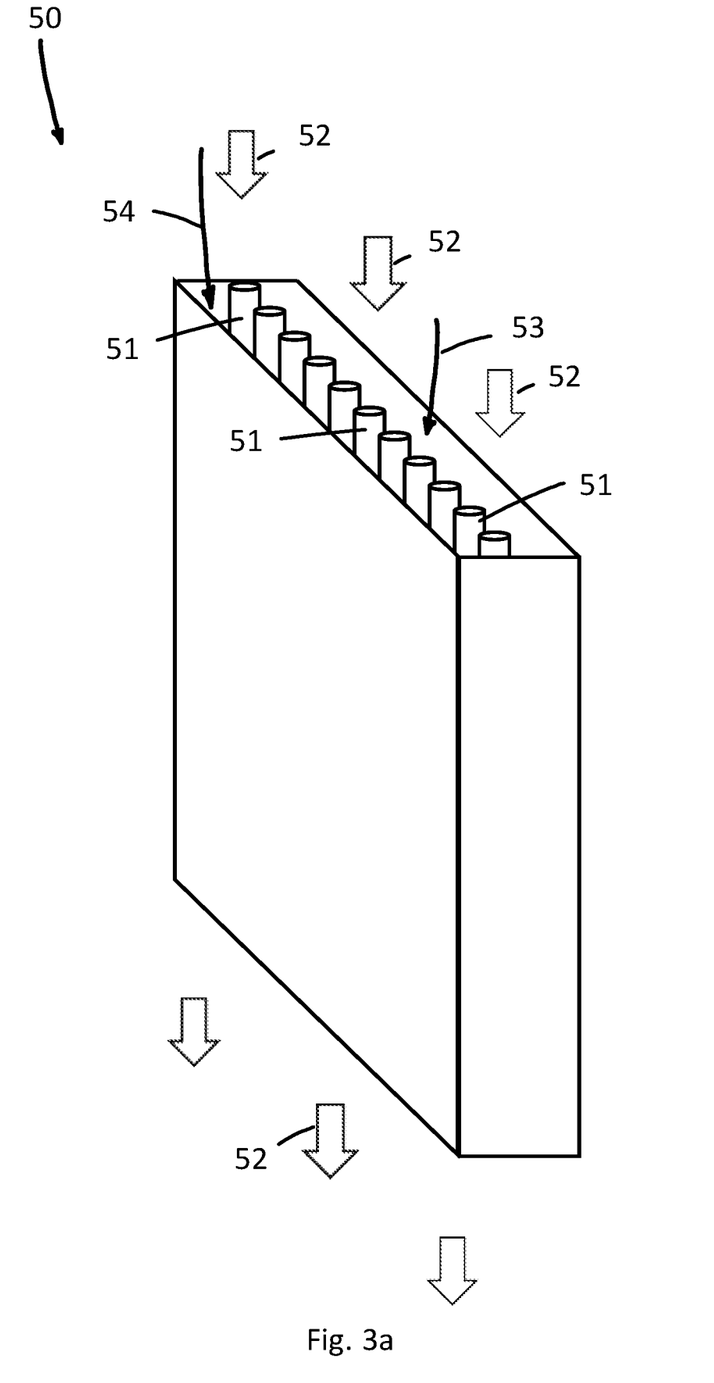

FIG. 3a schematically shows the absorber chamber (or heat chamber) 50 of a conventional reformer operated according to the invention. Reforming is used for the chemical transformation in process engineering and is often carried out in a catalytic manner as an endothermic process. In particular, "tubular reformers" are known, i.e. reforming systems, in which the materials to be processed are guided in pipes through a heat chamber so that the heat required for the chemical process can be fed to the materials through the pipes. The heat is generated by burners, the combustion products often contain soot radiating in the infrared range and also gasses radiating in the infrared range.

The heat chamber, which represents a furnace, is oblong and rectangular.

Along the centre line of the heat chamber, the pipes are arranged in a row one after the other so that, on both sides of the pipes, there is an elongated sub-chamber, into which the flames generated by the burners act. In the case of the "top fired" principle, the flames protrude from above into the sub-chambers; in the case of the "terraced wall" principle, the burners are arranged on steps of the outer walls of the sub-chambers, and, in the case of the "side fired" principle, the burners are arranged distributed across the outer walls. The disadvantage of this principle is that the temperature is difficult to control across the length of the pipes (high temperatures at the place of the flame, then sharp temperature drop) and that there must be enough space for the undisturbed development of the flame. Finally, this principle also results in the fact that, in a heat chamber, the pipes are arranged in rows to form an efficient relationship between the area of the flames and the area of the absorbent surfaces created by the pipes.

According to the invention, a conventional reformer with a heat chamber 50, in which pipes 51 are arranged next to each other running in a row, is provided with an inlet for indirectly heated gas radiating in the infrared range and the combustion arrangement is not used, i.e. decommissioned or expanded for the intended operation of the furnace, and thus of the reformer. In accordance with the arrows 52, the gas flows through the sub-chambers 53, 54 on both sides of the row of pipes 51 (and of course also between the pipes) and heats them by its infrared radiation.

For a rough calculation, it is again assumed that syngas should be produced in the reformer, wherein, in turn, an average pipe temperature of 1200° K is required for example. As with FIG. 1*b*, an outer pipe diameter of 130 mm, an inner pipe diameter of 100 mm and a pipe length of 12 m here (i.e. a height of the heat chamber 50 of 12 m) is assumed, wherein the heat flow q̇ into a pipe 7 should be 100 kW/m² of the pipe surface. The temperature of the outer wall is 350° K, the convective heat transfer coefficient h 10 W/(m²K), which results in a total heat flow q̇ (by convection and heat radiation) of 0.89 kW/m² due to the insulation at an ambient temperature of 300 K.

If, for example, methane is burned in air under ambient pressure in the furnace of the conventional reformer ($CH_4 + 2 O_2 + 8 N_2 \rightarrow CO_2 + 2 H_2O + 8 N_2$) and the operation according to the invention with indirectly heated gas, here water vapour under ambient pressure, is contrasted with this conventional operation, according to the rough calculation of the applicant, the following results:

| Parameter | Conventional oven | Indirectly heated gas |
|---|---|---|
| $T_{in}$ (temperature of flame/inlet temperature of the gas) | 2050° K | 1580° K |
| $T_{out}$ (outlet temperature of the gas) | 1330° K | 1340° K |
| v (Flow rate) | 3.6 m/s | 11.2 m/s |
| $T_{Gas}$ average temperature of the gas for the rough calculation | 1550° K | 1460° K |
| p (partial pressure of gas radiating at the infrared range - $N_2$ does not radiate infrared) | 0.27 bar | 1 bar |
| Ψ (ratio, absorption/absorption + convection) | 0.95 | 0.97 |

A conventional reformer, which generates the required heat via a furnace, can thus be operated via the operating method according to the invention with indirectly heated gas radiating in the infrared range. Thereby, it is advantageous that the indirectly heated gas can be guided in the circuit (with or without heat store; see FIG. 2*a*) in contrast to the furnace, in which the flue gases cannot be re-utilized. In addition, if indirect heating takes place by means of a solar receiver, the environmental footprint can be significantly reduced without major investments being required on the reformer's side. Ultimately, it also applies here too that a more uniform and therefore more favourable heat distribution is to be expected in the absence of a necessarily very hot flame across the length of the pipes.

Figure 3B:
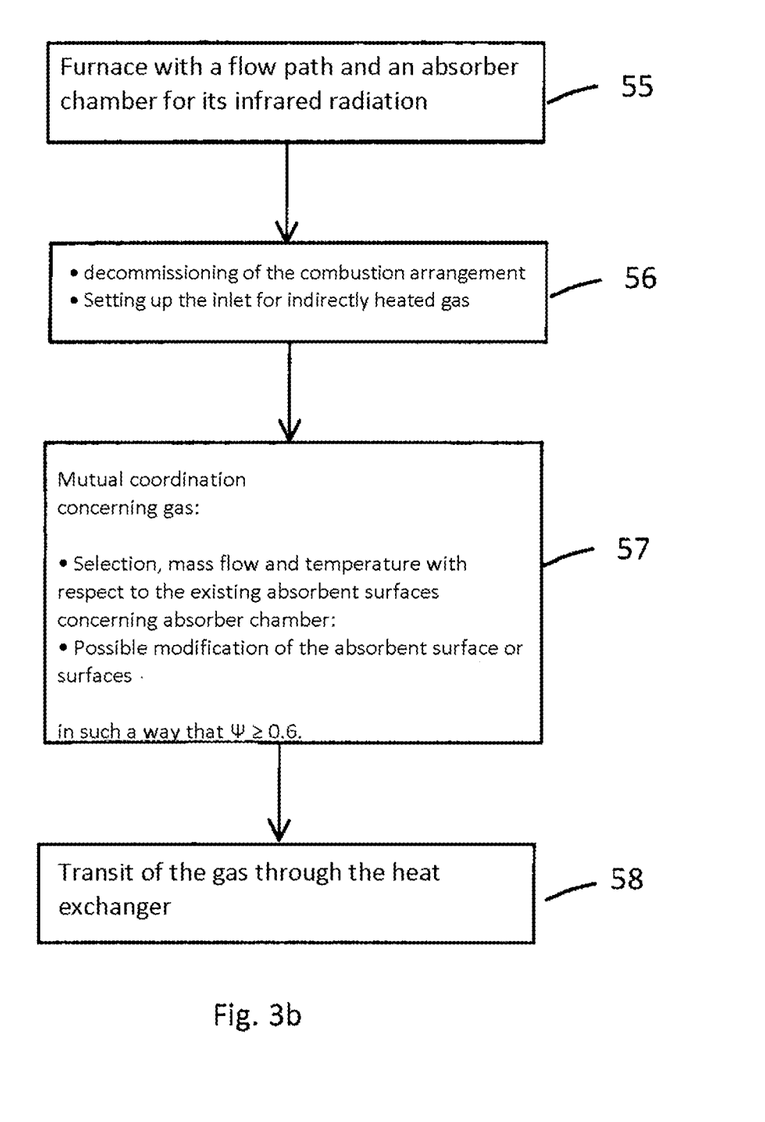

FIG. 3*b* shows the steps of the method according to the invention for operating a furnace. At step 55, a furnace or a reformer is selected to operate it instead of materials to be burned with indirectly heated gas radiating in the infrared range.

At step 56, the combustion arrangement is decommissioned or removed and an inlet for indirectly heated infrared-radiating gas is set up.

At step 57, analogous to step 46 in FIG. 2*b*, the infrared-radiating gas or gas mixture is selected, and its operating parameters are defined in order to achieve a ratio of Ψ≥0.6.

In step 58, the intended operation of the furnace is started with the transit of the gas. In turn, heteropolar gases are preferred. As mentioned above, $CO_2$, water vapour, $CH_4$, $NH_3$, CO, $SO_2$, HCl, NO, and $NO_2$ or a mixture of these gases are suitable. Non-radiating gases may be mixed by those skilled in the art on an individual basis if this is appropriate for procedural reasons, however in the limits indicated by the ratio Ψ.

According to the invention, a method for operating a furnace, which has a flow path for gases to be burned for the production of the useful heat, wherein, in the flow path, an absorber chamber is present which has at least one surface provided for the absorption for the heat exchange via infrared radiation, and wherein the combustion arrangement of the furnace is not used and is provided with a in inlet for indirectly heated gas radiating in the infrared range in such a way that this gas can be operatively guided into the flow path for gases to be burned and guided along it, and that indirectly heated gas radiating in the infrared range is supplied to the furnace during operation with a mass flow and a temperature so that the ratio Ψ of the heat flow by means of absorption to the entire heat flow is ≥0.6 in the at least one absorbent surface. Preferably, the furnace is switched into a circuit consisting of indirectly heated gas, which preferably encloses a heat store.

In the case of an embodiment not shown in the figures, the heat exchange in the heat exchanger according to the invention does not take place via lines, which guide a fluid absorbing the exchanged heat, but directly onto a material present in the absorber chamber, which heats up due to the absorption of infrared radiation, for example, metals for a heat treatment or for generating a metal melt or, for example, also for manufacturing glass by generating a melt consisting of the source products. This results in a method where, preferably, an absorbent surface is formed by a material to be heated.

Figure 4:
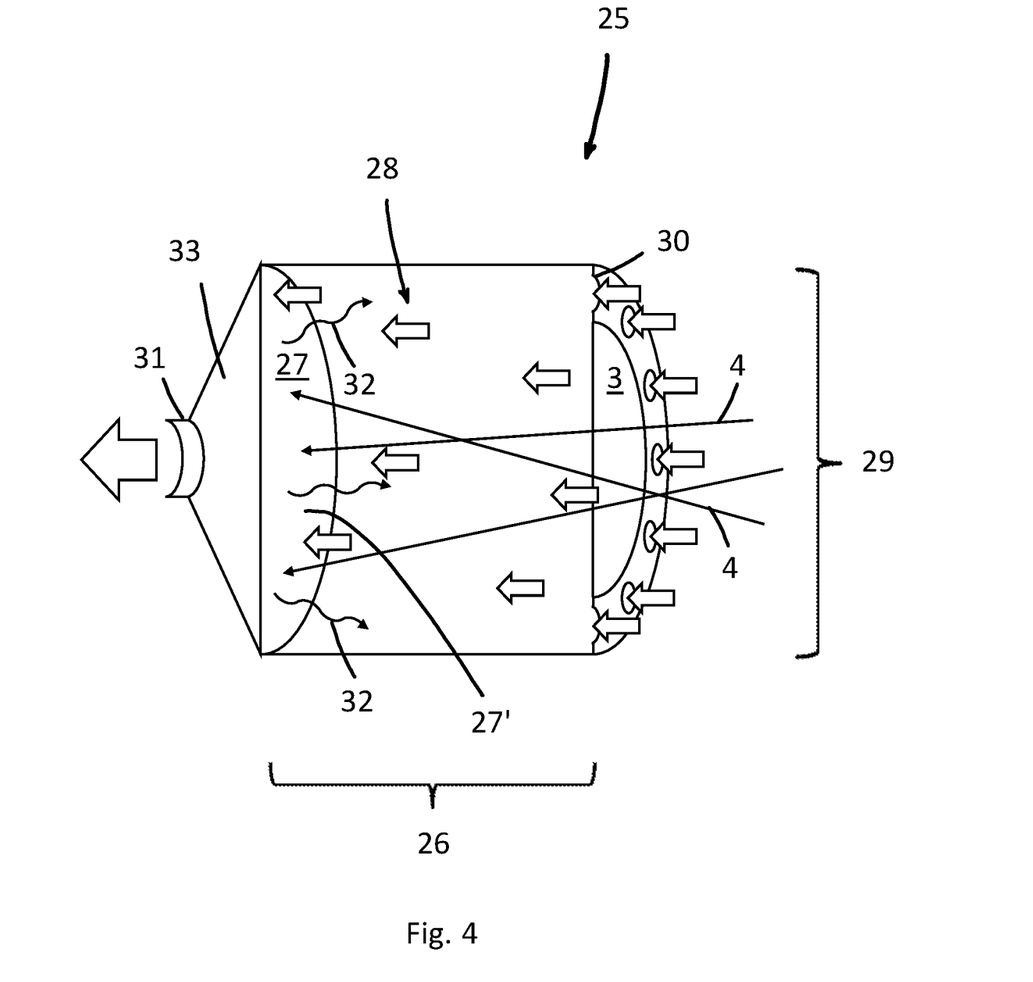

FIG. 4 schematically shows a receiver 60 according to the as yet unpublished Swiss patent application CH 00627/17 for the indirect heating of a gas or gas mixture radiating in the infrared range. The receiver 60 possesses a heating area 61, which has an optical opening 62, for example, a quartz window, and an absorber 63, wherein, between the quartz window 64 and the absorber 63, an absorption area 65 is provided, which infrared-radiating gas to be heated flows through according to the drawn-in arrows from right to left, i.e. against the absorber 63. In addition, the transport device 66 of the receiver 60 has inlet nozzles 67 arranged around the quartz window 64 for heat-transporting medium, which lead into the absorption area 65, and a central outlet nozzle 68 behind the absorber 63.

According to the invention, the absorber 63 is designed as a black-body radiation arrangement, i.e., it possesses a surface 70 arranged in the path of the incidental solar radiation 69 that absorbs this radiation, which is designed in such a way that it operatively heats up due to the incidental solar radiation 69 falling on the surface 70 and then emits infrared radiation 71 into the absorption area 65 across its surface 70 accordingly.

Thereby, the absorber 63 emits a primary portion of its heat power into the absorption area 65 in the form of infrared radiation, where the gas flowing towards it is already heated in an absorptive manner before it reaches it.

As mentioned above, a real structure only radiates approximately like the ideal black body does. In the present, under a "black-body radiation arrangement", it is understood that the incidental solar radiation 69 is absorbed on the surface of the absorber to the furthest extent possible (meaning primarily only penetrating into the absorber a little bit in contrast to the volumetric absorber) so that this surface heats up to a high temperature and, by means of this, it radiates like a black-body into the absorption area with the high temperature concerned. The primary proportion of the radiation emitted into the absorption area 65 is in the infrared range at absorber 63 temperatures of up to 2000° K (or also above this), i.e. at lower frequencies with relation to visible light.

A complex absorber structure, in particular, being provided for volumetric receivers and being graduated across its depth, which also absorbs incidental radiation across its depth accordingly while this is at least partially scattered in its interior space and is increasingly absorbed after reflection has occurred a multiple of times, is thereby dispensed with.

Thereby, complex thermal problems that frequently occur in the case of such absorber structures are also done without. Thereby, the absorber 63 is designed for a low level of convection to take place, meaning, it can be easily flowed through without increased convective characteristics being of importance for the heat exchange. With that, the design for maximized convection of the flowing medium is also dispensed with, i.e. the structure necessary for a heat exchanger that is as efficient as possible along with a large surface in comparison with the flowing volume of the heat-exchanging medium, which is complex to produce at a high level of efficiency and, during operation, results in a considerable drop in pressure of the flowing medium.

On this note, it must be mentioned that a certain convective heat transfer at the absorber 63 caused is naturally unavoidable, in particular, in the case of the embodiment shown in FIG. 4 since this forms a wall section of the absorption area 65 there. The corresponding convective heat transfer to the heat-transporting gas is natural in terms of the heat transfer, however, the outlet temperature $T_{out}$ of the heated gas should be based on absorption to a primary or predominant extent (see below for more information), thereby making a simplified construction of the receiver 60 possible. As mentioned above, the simplified construction of the absorber 63, among other things, opens up the possibility for a more stable operation, for example, from a thermal point of view (temperature distribution via the absorber 63), which results in an increased level of industrial suitability of the receiver.

A receiver results with the heating area for heating a heat-transporting medium, which has an optical opening for sunlight, an absorber absorbing the sunlight arranged in the path of the incidental sunlight, and a transport arrangement for the transport of the medium through the heating area, wherein the absorber is designed as a black-body radiation arrangement with reduced convection and the transport arrangement for the transport of a gas is designed as a heat-transporting medium.

Thereby, it is preferred if the absorber is designed as a black-body radiation arrangement with reduced convection for the flow of the heat-transporting gas and it is furthermore preferably located opposite to the optical opening 64.

Furthermore, an infrared-absorbing gas or gas mixture is used as a heat-transporting medium, which absorbs in frequency bands belonging to the infrared range. For example, such gases include heteropolar gases, preferably $CO_2$, water vapour, $CH_4$, $NH_3$, CO, $SO_2$, HCl, NO, and $NO_2$. When using such gases, ultimately, a greenhouse effect, which can be used by the receiver 60 or is used, results since these gases are highly translucent for the visible light that thereby primarily reaches the absorber 63, however are only a little bit to hardly translucent for the infrared radiation of the absorber 63 so that they heat up in an absorptive manner. Here, it must be mentioned that real gases do not absorb visible light or infrared radiation evenly across all frequencies and are not translucent, but, above all, have various intensities at frequency bands specified for a respective gas. In addition, the absorption declines as the distance from the radiation source increases. By means of this, with regard to the absorption or the transparency of radiation, mention is made above of "highly translucent" or of "a little bit to hardly translucent".

The absorber 63 can be designed as a perforated plate, preferably as a double perforated plate or as a simple flat mesh structure. In the case of the perforated plate, a perforation pattern is distributed across the extent of it so that the heat-transporting gas can easily flow, however, thereby providing enough surface of the perforated plate or as much surface as possible for the absorption of the incidental solar radiation and the infrared back radiation into the absorber chamber. The person skilled in the art can easily determine the perforation pattern in specific cases in an optimum manner. This also in the case with a mesh structure or a double perforated plate with two plates that are parallel to each other, wherein then the perforations of the one plate are arranged offset to each other with regard to those of another plate in such a way that, despite the low-convection passage of the heat-exchanging gas, a radiating surface of the absorber, which is as constant as possible, faces the absorption area. A suitable material for the absorber is silicon carbide SiC.

Since gases absorbing in the infrared range also radiate in the infrared range, the above-mentioned gases can be provided for solar heating in the receiver (preferred, but not exclusively) of a tower solar power plant and then provided for the heat exchange according to the invention. It is also possible that a receiver in accordance with FIG. 2 is used in dish concentrators since temperatures up to 2000° K and beyond are also achievable there because of the two-dimensional concentration of solar radiation.

The invention claimed is:

1. A method for exchanging heat contained in a fluid the method comprising:
   using an indirectly heated gas which emits infrared radiation as the fluid,
   guiding said fluid to the heat exchanger via an inlet and through an absorber chamber in the heat exchanger, wherein at least one infrared radiation absorbent surface, which absorbs the infrared radiation of the gas in order to use the heat of the gas, is provided in the absorber chamber, and
   wherein the mass flow and the temperature of the gas is balanced with a geometry of the at least one surface which is absorbent for the heat exchange such that the ratio $\Psi$ of the heat flowing through the surface as a result of absorption to the total heat flowing through the surface is ≥0.6 during operation.

2. The method according to claim 1, wherein the ratio $\Psi$ is ≥0.7, preferably ≥0.8 and, being particularly preferred, ≥0.9.

3. The method according to claim 1, wherein the gas comprises a heteropolar gas, preferably CO2, water vapour, CH4, NH3, CO, SO2, HCl, NO, and NO2 or a mixture of these gases.

4. The method according to claim 1, wherein the at least one surface is formed by lines for a medium to be heated, preferably pipelines or by at least one wall section of the absorber chamber.

5. The method according to claim 1, wherein an absorbent surface is formed by a material to be heated.

6. The method according to claim 1, wherein the gas emitting the infrared radiation is guided in a circuit enclosing the heat exchanger, in which the gas is indirectly heated, and wherein, preferably, a heat store is provided in this circuit before the heat exchanger.

7. The method according to claim 1, wherein the gas is heated and at least one of the heat sources—receiver, heat store or heater, preferably an electrical heater that is preferably photovoltaically powered in particular—is used for indirect heating.

8. The method according to claim 1, wherein a gas heated indirectly to a temperature of 1000° K, preferably 1300° K and, being particularly preferred, ≥1500° K is used.

9. The method according to claim 1, wherein the gas emitting the infrared radiation subject to a pressure greater than the ambient pressure is guided through the absorber chamber, preferably ≥5 bar, preferably ≥10 bar, being particularly preferred, ≥20 bar, and being quite preferred ≥50 bar.

* * * * *